United States Patent [19]

Kunzler et al.

[11] Patent Number: 5,387,662
[45] Date of Patent: Feb. 7, 1995

[54] FLUOROSILICONE HYDROGELS

[75] Inventors: Jay Kunzler, Canandaigua; Richard Ozark, Solvay, both of N.Y.

[73] Assignee: Bausch & Lomb Incorporated, Rochester, N.Y.

[21] Appl. No.: 183,220

[22] Filed: Jan. 18, 1994

Related U.S. Application Data

[62] Division of Ser. No. 17,056, Feb. 12, 1993, Pat. No. 5,321,108.

[51] Int. Cl.$^6$ ............... C08F 230/08; C08F 214/18; C08F 220/56; C08F 226/10
[52] U.S. Cl. .................... 526/245; 526/242; 526/246; 526/279; 528/26; 528/32; 523/107
[58] Field of Search ............ 526/242, 245, 246, 279; 528/26, 32; 523/107

[56] References Cited

U.S. PATENT DOCUMENTS

| | | | |
|---|---|---|---|
| 3,408,429 | 10/1968 | Wichterle | 264/1 |
| 3,496,254 | 2/1970 | Wichterle | 264/1 |
| 4,084,459 | 4/1978 | Clark | 82/1 |
| 4,136,250 | 1/1979 | Mueller et al. | 528/29 |
| 4,153,641 | 5/1979 | Deichert et al. | 260/827 |
| 4,189,546 | 2/1980 | Deichert et al. | 528/26 |
| 4,197,266 | 4/1980 | Clark et al. | 264/1 |
| 4,259,467 | 3/1981 | Keogh et al. | 526/279 |
| 4,260,725 | 4/1981 | Keogh et al. | 526/279 |
| 4,440,918 | 4/1984 | Rice et al. | 526/246 |
| 4,486,577 | 12/1984 | Mueller et al. | 525/474 |
| 4,605,712 | 8/1986 | Mueller et al. | 525/474 |
| 4,740,533 | 4/1988 | Su et al. | 523/106 |
| 4,810,764 | 3/1989 | Friends et al. | 526/245 |
| 4,954,587 | 9/1990 | Mueller | 526/245 |
| 4,990,582 | 2/1991 | Salamone | 526/245 |
| 5,010,141 | 4/1991 | Mueller | 525/176 |
| 5,034,461 | 7/1991 | Lai et al. | 525/100 |
| 5,070,215 | 12/1991 | Bambury et al. | 556/418 |
| 5,079,319 | 1/1992 | Mueller | 526/238.23 |
| 5,250,583 | 10/1993 | Kawaguchi et al. | 526/279 |
| 5,310,779 | 5/1994 | Lai | 524/588 |
| 5,358,995 | 10/1994 | Lai et al. | 524/547 |

FOREIGN PATENT DOCUMENTS 0412485 2/1991 European Pat. Off.
8203397 10/1982 WIPO.

OTHER PUBLICATIONS

Document No. 07/922292 filed Oct. 25, 1994, Lai et al.

Primary Examiner—Paul R. Michl
Assistant Examiner—Andrew E. C. Merriam
Attorney, Agent, or Firm—David M. Krasnow

[57] ABSTRACT

Novel fluorosiloxane-containing monomers are disclosed which are especially useful for the preparation of biomedical materials such as contact lenses.

22 Claims, No Drawings

FLUOROSILICONE HYDROGELS

This is a divisional of copending application Ser. No. 08/017,056 filed on Feb. 12, 1993, now U.S. Pat. No. 5,321,108.

BACKGROUND OF THE INVENTION

1. Field of the Invention

The present invention relates to novel polymeric compositions and more particularly to contact lenses made therefrom. The invention further particularly relates to polysiloxane-containing monomers having at least one polar fluorinated side chain. The monomers described herein can be used to make "hard" or "soft" contact lenses, intraocular implants, as well as other prostheses, and more particularly "soft" hydrogel contact lenses.

2. Background

In the field of contact lenses, various factors must combine to yield a material that has appropriate characteristics. Oxygen permeability, wettability, material strength and stability are but a few of the factors which must be carefully balanced to achieve a useable contact lens. Since the cornea receives its oxygen supply exclusively from contact with the atmosphere, good oxygen permeability is a critical characteristic for any contact lens material. Wettability also is important in that, if the lens is not sufficiently wettable, it does not remain lubricated and therefore cannot be worn comfortably in the eye. The optimum contact lens would therefore, have both excellent oxygen permeability, and excellent tear fluid wettability.

Polysiloxane materials are useful materials for making contact lenses due to, among other properties, their excellent oxygen permeability. See U.S. Pat. Nos. 4,153,641 and 4,189,546. However polysiloxanes are generally hydrophobic. Certain hydrophilic functional groups may be attached to polysiloxane-containing monomers, or prepolymers to improve their wettability. See U.S. Pat. Nos. 4,260,725 and 4,259,467. However, many hydrophilic comonomers are known to be incompatible with the polysiloxane monomers in the monomer mix, and require the presence of solubilizers and compatibilizers for the monomer mix properly polymerize. Without such compatibilizers, the copolymer may not polymerize at all, risking varying degrees of phase separation which renders the polymerized material opaque.

In addition to oxygen permeability, wettability and compatibility requirements, contact lens materials must resist deposits. Some polysiloxane materials tend to accumulate deposits. Fluorinating certain polysiloxanes monomers is known to improve deposit resistance. See, for example U.S. Pat. Nos. 4,440,918, 4,990,382, 4,954,587, 5,079,319 and 5,010,141.

Fluorinated polysiloxanes with useful properties for non-hydrogel contact lenses are disclosed in U.S. Pat. Nos. 4,810,764 and 5,142,009. In further experimentation with these materials, it was determined that a hydrogel having the oxygen permeability advantages imparted by the siloxane group, and the lipid resistance imparted by the fluorinated groups would be particularly advantageous. However, because the fluorinated polysiloxane monomers are difficult to solubilize in the hydrophilic monomers used, it is difficult to make viable hydrogel formulations for contact lenses using this approach. If comonomers are not sufficiently soluble in one another, phase separation will occur rendering the polymerized material opaque. Such a result is not desirable for a material which must be transparent, such as a contact lens.

Compatibilizers or solubilizers such as methyl ethyl ketone (MEK) have been used to get certain fluorinated siloxane-containing monomers into solution to form films or lenses. However, such solubilizers and compatibilizers often affect purity and must be extracted from the resulting polymer. Such extraction requires additional processing steps. Further, if there is a large difference in polarity between the siloxane-containing monomer and the hydrophilic monomer, even the presence of solubilizers such as MEK will not keep the comonomers in solution.

Therefore, a hydrolytically stable polymeric system comprising the benefits of polysiloxane-containing monomers for oxygen permeability and material strength, and fluorinated side-groups for resistance without use of compatibilizers or solubilizers would be of great advantage for a hydrogel formulation.

SUMMARY OF THE INVENTION

It has now been discovered that the compatibility and solubility of fluorinated polysiloxanes in hydrophilic comonomers can be greatly improved by attaching to a siloxane group in a polysiloxane-containing monomer, a polar fluorinated graft or side group having a hydrogen atom attached to a terminal difluoro-substituted carbon atom. When this hydrogen atom is present on the terminal difluorinated carbon atom, the fluorinated polysiloxane is rendered soluble in hydrophilic comonomers to such an extent that no additional compatibilizing or solubilizing agents are needed. When the terminal hydrogen atom is replaced with a fluoro group, the solubility is drastically affected such that the hydrophilic comonomers are insoluble in the fully fluorinated siloxane-containing monomer.

DETAILED DESCRIPTION OF THE INVENTION

The fluorinated polysiloxane-containing monomers disclosed herein surprisingly display outstanding compatibility by being highly soluble in various hydrophilic compounds, such as N-vinyl pyrrolidone (NVP) and N,N-dimethyl acrylamide (DMA), without the need for additional compatibilizers or solubilizers.

As used herein, the term "side group" refers to any chain branching from a siloxane group, and may be a side chain when the siloxane is in the backbone of the polymeric structure. When the siloxane group is not in the backbone, the fluorinated strand or chain which branches out from the siloxane group becomes a side chain off of the siloxane side chain.

The "terminal" carbon atom refers to the carbon atom located at a position furthest from the siloxane group to which the fluorinated strand, or side group is attached.

It was discovered and is disclosed herein that when the polar fluorinated group, $-(CF_2,_zH$, is placed at the end of a side group attached to a siloxane-containing monomer, the entire siloxane monomer to which the side group is attached is rendered highly soluble in hydrophilic monomers, such as NVP. When the hydrogen atom in the terminal fluorinated carbon atom is replaced with a fluoro group, the siloxane-containing monomer is significantly less soluble, or not soluble at all in the hydrophilic monomer present.

In one embodiment of the present invention, fluorinated siloxane-containing monomers are disclosed having at least one fluorinated side group, said side group having the general schematic representation (I):

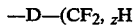  I.

wherein
z is 1 to 20; and
D is an alkyl or alkylene group having 1 to 10 carbon atoms and which may have ether linkages between carbon atoms.

In a further embodiment, the fluorinated siloxane-containing monomers have at least one fluorinated side group and have a moiety of the following general schematic representation (II):

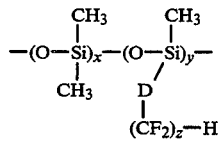  II.

wherein:
D is an alkyl or alkylene group having 1 to 10 carbon atoms and which may have ether linkages between carbon atoms;
$x \geq 0$;
$y \geq 1$;
$x+y = 2$ to 1000; and
z is 1 to 20.

More preferred are the fluorinated siloxane-containing monomers having the following general schematic representation (III):

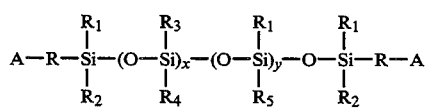  III.

wherein:
R is an alkyl or alkylene group having 1 to 10 carbon atoms and which may have ether linkages between carbon atoms;
$R_1$-$R_4$ may independently be a monovalent hydrocarbon radical or a halogen substituted monovalent hydrocarbon radical having 1 to 18 carbon atoms which may have ether linkages between carbon atoms;
$x \geq 0$;
$y \geq 1$;

$x+y = 2$ to 1000; and
z is 1 to 20; and
$R_5$ is a fluorinated side chain having the general schematic representation:

wherein
z is 1 to 20;
D is an alkyl or alkylene group having 1 to 10 carbon atoms and which may have ether linkages between carbon atoms; and
A is an activated unsaturated group, such as an ester or amide of an acrylic or a methacrylic acid or is a group represented by the general formula:

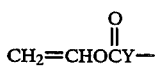

wherein
Y is —O—, —S— or —NH—;
Preferably, the fluorinated side group is represented by the formula:

where
z is 1 to 20.

One preferred fluorinated siloxane-containing monomer, is prepared according to the following reaction scheme:

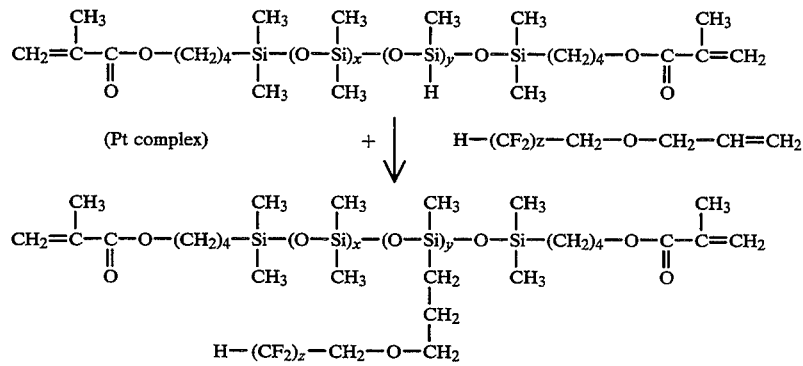

where
y is 10, 25 and 40;
x +y is 100; and
z is 4 or 6

In still a further embodiment of the present invention, the fluorinated siloxane-containing monomers are fluorinated bulky polysiloxanylalkyl (meth)acrylate monomers represented by the general schematic representation:

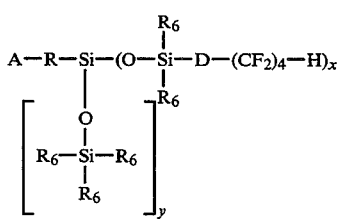

wherein

A is an activated unsaturated group, such as an ester or amide of an acrylic or a methacrylic acid;

$R_6$ is $CH_3$ or H;

R is an alkyl or alkylene group having 1 to 10 carbon atoms and which may have ether linkages between carbon atoms;

D is an alkyl or alkylene group having 1 to 10 carbon atoms and which may have ether linkages between carbon atoms;

x is 1, 2 or 3;

y is 0, 1, or 2; and x+y=3.

Also preferred are the fluorinated bulky polysiloxanylalkyl monomers of the following formula:

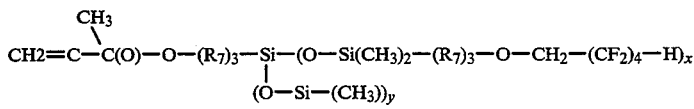

wherein $R_7$ is $CH_2$; and x is 1, 2 or 3;

y is 0, 1 or 2; and x+y=3.

The fluorinated polysiloxane-containing monomers of the present invention combine the desirable features of known hydrophilic side chain polysiloxanes, such as relative compatibility with hydrophilic monomers, with improved deposit resistance from the fluorinated group. Desired properties of the lenses may be affected and controlled. For example, by altering the relative ratio of the comonomers (the aforementioned fluorinated polysiloxane monomer to the hydrophilic monomer or monomers), certain hydrogel characteristics in the polymerized fluorinated polysiloxane copolymer may be altered.

The relative softness or hardness of the contact lenses fabricated from the resulting polymers of this invention can be varied by decreasing or increasing the molecular weight of the polysiloxane monomer end-capped with the activated unsaturated group or by varying the percent of the comonomers present. Generally, as the ratio of polysiloxane units to end-cap units increases, the softness of the material increases.

The present invention contemplates the use of the fluorinated polysiloxane monomer for both "hard" and "soft" contact lenses, the disclosed formulations are thought to be especially useful as "soft" hydrogel contact lenses. A lens is considered to be "soft" if it can be folded back upon itself without breaking.

A hydrogel is a hydrated cross-linked polymeric system that contains water in an equilibrium state. Silicone hydrogels (i.e., hydrogels containing silicone) are usually prepared by polymerizing a mixture containing at least one silicone-containing monomer and at least one hydrophilic monomer. Either the silicone-containing monomer or the hydrophilic monomer may function as a crosslinking agent (a crosslinker), being defined as a monomer having multiple polymerizable functionalities. Alternatively, an additional crosslinker may be employed.

When the term "activated" is used with the term "unsaturated group" herein, it is meant that an unsaturated group which is activated is one which has a substituent which facilitates free radical polymerization. These activated unsaturated groups are polymerized to form the polymers of the present invention. Preferably the activating groups lend themselves to polymerization under mild conditions, such as, ambient temperatures.

When the term "polymerization" is used herein we refer to the polymerization of the double bonds of the polysiloxanes endcapped with polymerizable unsaturated groups which results in a crosslinked three dimensional network.

Further, notations such as "(meth)acrylate" or "(meth)acrylamide" are used herein to denote optional methyl substitution. Thus, for example, (meth)acrylate includes both acrylate and methacrylate and N-alkyl(meth)acrylamide includes both N-alkyl acrylamide and N-alkyl methacrylamide.

The term "prepolymer" denotes a monomer which may be a high molecular weight monomer containing at least two polymerizable groups. The monomers added to the monomeric mixture of the present invention may be monomers or prepolymers. Thus, it is understood that the terms "silicone-containing monomers" and "hydrophilic monomers" include corresponding prepolymers. Examples of such monomers can be found in U.S. Pat. Nos. 4,136,250; 4,153,641; 4,740,533; 5,034,461 and 5,070,215.

The terms "shaped articles for use in biomedical applications" or "biomedical devices or materials" mean the hydrogel materials disclosed herein have physicochemical properties rendering them suitable for prolonged contact with living tissue, blood and the mucous membranes.

The monomers of the present invention can be used to produce highly wettable hydrogels with ideal rigidity, oxygen permeability and other physical properties. Such silicone-containing hydrogels are well-suited for use as biomedical devices such as contact lenses.

Certain crosslinked polymeric materials, such as those contemplated by the present invention, may be polymerized to form a hard water-free xerogel. Xerogels are understood to be unhydrated hydrogel formulations which may be physically altered to, for example, impart optical properties through machining, and then be hydrated and retain their water content and optical properties.

Preferred acrylic-capped polysiloxane monomers of the present invention are those having from about 1 to about 200 repeating siloxy units, and most preferably have about 100 repeating siloxy units.

The fluorinated bulky polysiloxanylalkyl (meth)acrylate-containing monomers of the present invention are excellent materials for use with both "hard" and "soft" systems which may or may not be hydrogels. The preferred bulky polysiloxanylalkyl (meth)acrylate containing monomers are, for example, methacryloxypropyl tris(octafluoropentyl-oxypropyldimethylsiloxy)silanes.

The preferred fluorinated side groups are the alkyl fluorinated side chains, such as the propyloxyoctafluoropentanes, the propyloxytetrafluoropropanes and the propyloxydodecaheptanes, with the propyloxy octafluoropentanes being the most preferred.

The present invention contemplates, in one preferred embodiment, polymerizing, in a monomer mix, more than one type of polysiloxane monomer, one of which has at least one polar fluorinated siloxane-containing monomer, with at least two hydrophilic monomers to produce a contact lens material.

Additional hydrophilic monomers may be incorporated into the polymeric compositions contemplated by the present invention to form hydrogels. Such preferred hydrophilic monomers may be either acrylic- or vinyl-containing and may be used as crosslinking agents. The term "vinyl-type" or "vinyl-containing" monomers refers to non-acrylic monomers containing the vinyl grouping ($CH_2=CH_2$). Such hydrophilic vinyl-containing monomers are known to polymerize relatively easily. "Acrylic-type" or "acrylic-containing" monomers are those monomers containing the acrylic group

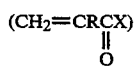

wherein R is H or $CH_3$, and X is O or NH.

Preferred hydrophilic vinyl-containing monomers which may be incorporated into the hydrogels of the present invention include monomers such as N-vinyl lactams (e.g. N-vinyl pyrrolidone (NVP)), N-vinyl-N-methyl acetamide, N-vinyl-N-ethyl acetamide, N-vinyl-N-ethyl formamide, N-vinyl formamide, with NVP being the most preferred.

Preferred hydrophilic acrylic-containing monomers which may be incorporated into the hydrogel of the present invention include hydrophilic monomers such as N,N-dimethyl acrylamide (DMA), 2-hydroxyethyl methacrylate, glycerol methacrylate, 2-hydroxyethyl methacrylamide, methacrylic acid and acrylic acid, with DMA being the most preferred.

The relative ratio (wt. %) of siloxane-containing monomer to total wt. % of comonomer mix is preferably from about 10% to about 85%, more preferably from about 20% to about 70%, and most preferably from about 25% to about 40%. The relative ratio (wt. %) of hydrophilic monomer(s) to total wt. % of the comonomer mix is preferably from about 20% to about 90%, more preferably from about 30% to about 80%, and most preferably from about 50% to about 60%.

The preferred silicone-containing vinyl carbonate or vinyl carbamate monomers include: 1,3-bis(4-vinyloxycarbonyloxy)but-1-yl)tetramethyl-disiloxane; 3-(trimethylsilyl)propyl vinyl carbonate; 3-(vinyloxycarbonylthio)propyl-(tris(trimethylsiloxy)silane); 3-(tris(trimethylsiloxy)silyl)propyl vinyl carbamate; 3-(tris(trimethylsiloxy)silyl)propyl allyl carbamate; 3-tris(trimethylsiloxy)silyl)propyl vinyl carbonate; t-butyldimethylsiloxyethyl vinyl carbonate; trimethylsilylethyl vinyl carbonate; trimethylsilylmethyl vinyl carbonate; and "$V_2D_{25}$" as shown in the following formula:

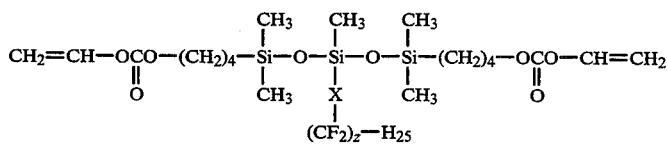

wherein
X is an alkyl or alkylene group having 1 to 10 carbon atoms and which may have ether linkages between carbon atoms; and
z is 1 to 20.

When it is desirable for both an acrylic-containing hydrophilic monomer and a vinyl-containing hydrophilic monomer to be incorporated into the silicone-containing polymer of the present invention, a further crosslinking agent having both a vinyl and an acrylic polymerizable group may be used, since these vinyl and acrylic hydrophilic monomers have different reactivity ratios and copolymerize at vastly different rates or will not copolymerize at all. Such crosslinkers, such as methacryloxyethyl vinyl carbonate (HEMAVc) and methacryloylethyl vinyl carbamate, which facilitate the copolymerization of the comonomers and are the subject of presently co-pending and commonly assigned U.S. patent application Ser. No. 07/922,452 filed Jul. 30, 1992. Such crosslinkers are represented by the following schematic representation:

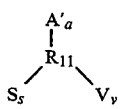

wherein
V denotes a vinyl-containing group having the formula:

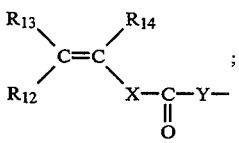

A' denotes an acrylic-containing group having the formula:

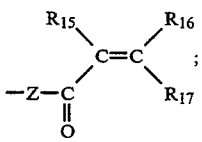

S denotes a styrene-containing group having the formula:

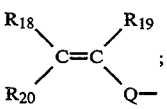

wherein
$R_{11}$ is an alkyl radical derived from substituted and unsubstituted hydrocarbons, polyalkylene oxide, poly(perfluoro) alkylene oxide, dialkyl-capped polydimethylsiloxane, dialkyl-capped polydimethylsiloxane modified with fluoroalkyl or fluoroether groups;
$R_{12}$–$R_{20}$ are independently H, or alkyl of 1 to 5 carbon atoms;
Q is an organic group containing aromatic moieties having 6–30 carbon atoms;

X, Y, and Z are independently O, NH or S;

v is 1, or higher; and a, s are independently greater than or equal to 0, and a+s is greater than or equal to 1.

Such crosslinkers help to render the resulting copolymer totally UV-curable. However, the copolymer could also be cured solely by heating, or with a combined UV and heat regimen. Therefore, it is understood that the necessary photo and thermal initiators required to cure the copolymer may be comprised therein as would be apparent to those skilled in the art.

Other crosslinking agents which may be incorporated into the silicone-containing hydrogel of the present invention include polyvinyl, typically di- or tri-vinyl monomers, most commonly the di- or tri(meth)acrylates of dihydric ethylene glycol, triethylene glycol, butylene glycol, hexane-1,6-diol, thio-diethylene glycol-diacrylate and methacrylate; neopentyl glycol diacrylate; trimethylolpropane triacrylate and the like; N,N'-dihydroxyethylene-bisacrylamide and -bismethacrylamides; also diallyl compounds like diallyl phthalate and triallyl cyanurate; divinylbenzene; ethylene glycol divinyl ether; and the (meth)acrylate esters of polyols such as triethanolamine, glycerol, pentanerythritol, butylene glycol, mannitol, and sorbitol. Further, illustrations include N,N-methylene-bis-(meth)acrylamide, sulfonated divinylbenzene, and divinylsulfone. Also useful are the reaction products of hydroxyalkyl (meth)acrylates with unsaturated isocyanates, for example the reaction product of 2-hydroxyethyl methacrylate with 2-isocyanatoethyl methacrylate (IEM) as disclosed in U.S. Pat. No. 4,954,587.

Other known crosslinking agents are polyether-bisurethane-dimethacrylates as described in U.S. Pat. No. 4,192,827, and those crosslinkers obtained by reaction of polyethylene glycol, polypropylene glycol and polytetramethylene glycol with 2-isocyanatoethyl methacrylate (IEM) or m-isopropenyl- γ, γ,-dimethylbenzyl isocyanates (m-TMI), and polysiloxane-bisurethane-dimethacrylates as described in U.S. Pat. Nos. 4,486,577 and 4,605,712. Still other known crosslinking agents are the reaction products of polyvinyl alcohol, ethoxylated polyvinyl alcohol or of polyvinyl alcohol-co-ethylene with 0.1 to 10 mol % vinyl isocyanates like IEM or m-TMI.

The instant copolymers can be readily cured to cast shapes by conventional methods such as UV polymerization, use of free radical thermal initiators or heat, or combinations thereof, as commonly used in polymerizing ethylenically unsaturated compounds. Representative free radical thermal polymerization initiators are organic peroxides, such as acetal peroxide, lauroyl peroxide, decanoyl peroxide, stearoyl peroxide, benzoyl peroxide tertiarybutyl peroxypivalate, peroxydicarbonate, and the like, employed in a concentration of about 0.01 to 1 percent by weight of the total monomer mixture. Representative UV initiators are those known in the field such as, benzoin methyl ether, benzoin ethyl ether, Darocure 1173, 1164, 2273, 1116, 2959, 3331 (EM Industries) and Igracure 651 and 184 (Ciba-Geigy).

In addition to the above-mentioned polymerization initiators and crosslinking agents, the monomeric mix and resulting copolymer of the present invention may also include additional materials such as colorants, toughening agents, UV-absorbing agents and other materials such as those known in the contact lens art.

The resulting polymers of this invention can be formed into contact lenses by the spincasting processes such as those disclosed in U.S. Pat. Nos. 3,408,429 and 3,496,254 and other conventional methods, such as compression molding as disclosed in U.S. Pat. Nos. 4,084,459 and 4,197,266.

Polymerization may be conducted either in a spinning mold, or a stationary mold corresponding to a desired contact lens shape. The thus-obtained contact lens may be further subjected to a mechanical finishing, as occasion demands. Also, the polymerization may be conducted in an appropriate mold or vessel to give a lens material in the form of button, plate or rod, which may then be processed (e.g., cut or polished via lathe or laser) to give a contact lens having a desired shape.

The hydrogels produced by the present invention are oxygen transporting, hydrolytically stable, biologically inert, and transparent. The monomers and copolymers employed in accordance with this invention, are readily polymerized to form three dimensional networks which permit the transport of oxygen and are optically clear, strong and hydrophilic.

The present invention provides materials which can be usefully employed for the fabrication of prostheses such as heart valves and intraocular lenses, as optical contact lenses or as films. More particularly, the present invention concerns contact lenses.

The present invention further provides articles of manufacture which can be used for biomedical devices, such as, surgical devices, heart valves, vessel substitutes, intrauterine devices, membranes and other films, diaphragms, surgical implants, blood vessels, artificial ureters, artificial breast tissue and membranes intended to come into contact with body fluid outside of the body, e.g., membranes for kidney dialysis and heart-/lung machines and the like, catheters, mouth guards, denture liners, intraocular devices, and especially contact lenses.

It is known that blood, for example, is readily and rapidly damaged when it comes into contact with artificial surfaces. The design of a synthetic surface which is antithrombogenic and nonhemolytic to blood is necessary for prostheses and devices used with blood.

The following examples serve only to further illustrate aspects of the present invention and should not be construed as limiting the invention.

EXAMPLE 1

Preparation of allyloxyoctafluoropentane

To a three-neck round bottom flask equipped with a mechanical stirrer and thermometer is added allyl bromide (16.9 g, 0.14 mole), octafluoro-1-pentanol (27.2 g, 0.1 mole), tetrabutylammonium hydrogen sulfate (1.7 g, 0.005 mole), 10 mls of 50% sodium hydroxide and 125 mls. of tetrahydrofuran. The reaction shown below is complete following six hours of reflux (70 degrees C.) as determined by GC. The resultant solution is washed two times with distilled water. The product layer is collected and distilled (68 degrees C./30 mm) to give 31 grams (70%) yield of allyloxyoctafluoropentane.

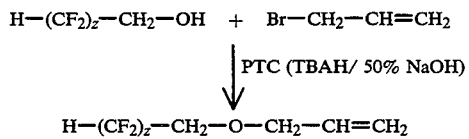

When z is 4 and 6, allyloxyoctafluoropentane and allyloxydodecafluoropentane side chains are produced respectively.

EXAMPLE 2

Preparation of a DP 100 methacrylate end-capped poly 75 mole % dimethyl siloxane-co-25 mole % methyl siloxane hydride prepolymer To a 1000 ml round bottom flask under dry nitrogen is added octamethylcyclotetrasiloxane (371.9 g, 1.25 mole), tetramethylcyclotetrasiloxane (100.4 g, 0.42 mole) and 1-3, bis-methacryloylbutyltetramethyldisiloxane (27.7 g, 0.7 mole). Trifluoromethane sulfonic acid (0.25%, 1.25 g) is added as initiator. The reaction mixture is stirred overnight at room temperature. Ten (10) grams of sodium bicarbonate is then added and the reaction mixture is again stirred overnight. The resultant solution is then filtered and placed under high vacuum at 50 degrees C. to remove the unreacted cyclic compounds. The monomer structure is confirmed by $^1$H-NMR spectroscopy.

EXAMPLE 3

Preparation of a DP 100methacrylate end-capped poly 75 mole% dimethylsiloxane-co-poly 25 mole% methyl octfluoropentyloxypropyl siloxane monomer (Octa-25)

To a 500 ml round bottom flask equipped with a magnetic stirrer and water condenser, is added 15 g (0.002 mole) of the silicone hydride monomer (as prepared in Example 1 2), 27.2 g (0.1 mole) of allyloxyoctafluoropentane (from example 2), 2.5 mls of tetramethyldisiloxane platinum complex (Huels-3% Pt in xylene) and 150 mls of anhydrous tetrahydrofuran (THF) and 75 mls dioxane under dry nitrogen. The reaction mixture as shown below is heated to 75 degrees C. and the reaction is monitored by IR spectroscopy for loss of silicone hydride. When the silicone hydride is removed (3-4 hours), the reaction mixture is cooled and the unreacted allyloxyoctafluoropentane is removed by heating the product under high vacuum at 50 degrees C. for one hour. The monomer structure is confirmed by $^1$H-NMR spectroscopy.

EXAMPLE 4

Preparation of a methacryloylpropyl tris(dimethylsiloxy)silane

To a three neck round bottom flask equipped with a thermometer and magnetic stirrer is added methacryloylpropyltrichlorosilane (2.5 g, 0.01 mole), dimethylchlorosilane (6.53 g, 0.069 mole), triethylamine (7.69 g, 0,076 mole) and 25 mls of anhydrous diethylether. The reaction mixture is cooled to $-15$ degrees C. and distilled water (5 g, 0.28 mole) is slowly added. The reaction is allowed to come to room temperature slowly and the reaction is stirred overnight. The resultant solution is washed three times with distilled water. The ether layer is collected, dried over magnesium sulfate, filtered and the diethylether is removed using a rotoevaporator. The resultant oil is vacuum distilled (83-93 degrees C./1 mm) to give a 51.4 % yield of 97.5% pure (as determined by GC) methacryloylpropyl tris (dimethylsilyloxy)silane.

EXAMPLE 5

Preparation of a methacryloylpropyl tris(octafluoropentyloxypropyldimethylsilyloxy)silane To a 200 ml round bottom flask is added methacryloylpropyl tris (dimethylsilyloxy) silane (5.0 g,0,013 mole), allyloxyoctafluoropentane (21.4 g, 0.079 mole), 0,005 ml of a platinum divinyl complex (Huels) and 50 mls of tetrahydrofuran. The solution is refluxed for one hour at which time the silicone hydride is reacted as shown by $^1$H-NMR spectroscopy. The tetrahydrofuran and unreacted allyloxyoctafluoropentane is removed using a rotoevaporator (50 degrees C. at 30 mm) resulting in a quantitative yield of methacryloylpropyl tris (octafluoropentyloxypropyldimethylsilyloxy)silane.

EXAMPLE 6

Physical Properties of Films Cast from 25 mole % octafluoro (octa-25) with dimethacrylamide (DMA)

All of the films cast for physical and mechanical property evaluation were prepared using the following procedure. The films were cast between silanized glass

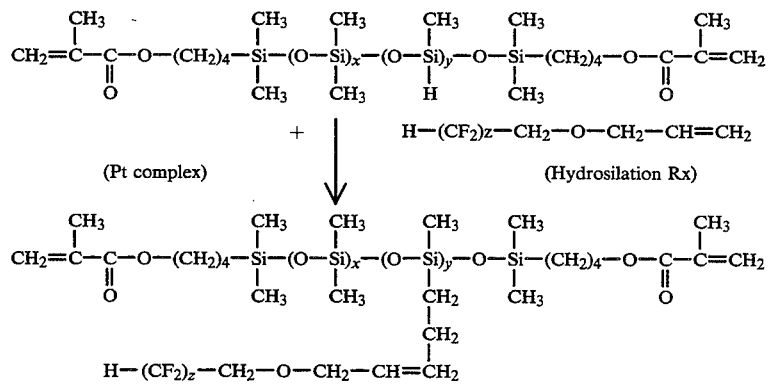

where
y is 10, 25 and 40;
x+y is 100; and
z is 4 and 6 plates using a Teflon gasket. The UV initiator was Darocur 1173 (0.5% concentration). The cure conditions consisted of irradiating the films for two hours with U.V. lamps at an intensity of 3700 uW/cm$^2$. Following the cure, the films were extracted in 2-propanol overnight at room temperature (300% expansion), dried at room temperature for two hours and boiled for two hours in buffered saline. The films were evaluated for mechanical properties, $O_2$ permeability and hydrolytic stability. The hydrolytic stability test consisted of heating the test samples at 80 degrees C. in buffered saline and monitoring the weight loss at 3, 5 and 7 days.

Table 1 shows the extractable, water content, $O_2$ permeability and mechanical data for films cast from the DP100 methacrylate end-capped 25 mole % octafluoro (octa-25) with dimethylacrylamide (DMA). No co-solvent was needed to solubilize the components. The films were transparent.

TABLE 1

Extractable, Water Content, Oxygen Permeability and Mechanical Data for Octafluoro Siloxane/DMA Based Formulations

| Mix | % Extract. | % Water | DK | Modulus | % Elong. | Tensile | Tear |
|---|---|---|---|---|---|---|---|
| 100/0 | 11.97 | 0.00 | 530 | 55 | 40 | 18 | 1.5 |
| 90/10 | 8.57 | 6.39 | 397 | 188 | 38 | 48 | 1.5 |
| 80/20 | 7.24 | 18.18 | 223 | 219 | 34 | 48 | 3.3 |
| 75/25 | 6.80 | 25.56 | 134 | 222 | 29 | 44 | 4.1 |
| 70/30 | 5.78 | 30.94 | 138 | 210 | 63 | 68 | 3.1 |

EXAMPLE 7

Comparative Example—Improved Solubility of the 25 mole % Octafluoro (octa-25) with Hydrophilic Monomers Compared with Siloxanes Not Having the —$CF_2$—H Terminal Group Formulations were prepared form 70 parts of a DP 100 methacrylate end-capped polydimethylsiloxane with 30 parts of DMA. The formulation gave a phase separated mixture. The polydimethylsiloxane and DMA were incompatible. No attempt to cast films from this mixture was made. In addition, solutions were prepared from a DP 100 methacrylate end-capped polydimethylsiloxane containing 25 mole % nonafluoro side chain, (i.e. the terminal —$CF_2$—H bond was replaced with a terminal fully fluorinated —$CF_3$ group), with 30 parts of DMA. A phase separated mixture resulted. The DMA and polysiloxane were incompatible. No attempt was made to cast films from this mixture.

EXAMPLE 8

Film Data—Fluorosiloxane/DMA/VDMO

Table 2 shows the extractable, water content, $O_2$ permeability and mechanical property data for films prepared from the DP100 methacrylate end-capped 25 mole % octafluorosiloxane with DMA and vinyldimethyloxazolidinone (VDMO) as the hydrophilic monomers. All of the films prepared were transparent.

TABLE 2

25 mole % Octafluorosiloxane/DMA/VDMO Formulation Properties

| Mix | % Extract. | % Water | DK | Modulus | % Elong. | Tensile | Tear |
|---|---|---|---|---|---|---|---|
| 70/30 | 5.8 | 34 | 145 | 180 | 40 | 47 | 3.1 |
| 70/30/1 | 6.4 | 33 | 132 | 156 | 39 | 37 | 2.9 |
| 70/30/3 | 5.9 | 37 | 102 | 106 | 36 | 22 | 2.5 |
| 70/30/5 | 5.0 | 42 | 66 | 103 | 50 | 30 | 2.6 |

EXAMPLE 9

Film Data—Fluorosiloxane/TRIS/DMA/NVP

Tables 3 and 4 show the extractable, water content, $O_2$ permeability and mechanical property data for films cast from the 25 mole % octafluorosiloxane with methacryloxy propyl tris(trimethylsiloxy)silane (TRIS), DMA and N-vinylpyrrolidinone (NVP).

TABLE 3

25 mole % Octafluorosiloxane/TRIS/DMA/NVP Formulation Properties

| Mix | % Water | DK | Modulus | Tear |
|---|---|---|---|---|
| 80/0/20/0 | 17 | 186 | 155 | 1.8 |
| 80/0/15/5 | 17 | 212 | 170 | 2.4 |
| 80/0/10/10 | 15 | 183 | 195 | 1.9 |
| 80/0/5/15 | 16 | 186 | 190 | 2.0 |
| 70/0/30/0 | 28 | 108 | 190 | 3.0 |
| 70/0/20/10 | 25 | 112 | 217 | 3.5 |
| 70/0/10/20 | 27 | 130 | 212 | 2.5 |
| 75/0/5/25 | 24 | 160 | 179 | 1.4 |
| 40/10/10/40 | 52 | 52 | 71 | 2.3 |

TABLE 4

25 mole % Octafluorosiloxane/TRIS/DMA/NVP/EGDMA Formulation Properties

| Mix | % Water | DK | Modulus | Tear |
|---|---|---|---|---|
| 50/0/10/40/0.2 | 41 | 65 | 171 | 2.4 |
| 40/10/10/40/0.2 | 46 | 63 | 83 | 2.3 |
| 25/25/10/40/0.2 | 51 | 81 | 32 | 4.5 |
| 10/40/10/40/0.2 | 54 | 76 | 20 | 9.2 |

All formulations contain 20 parts hexanol. EGDMA is ethylene glycol dimethacrylate.

EXAMPLE 10

Film Data—Tris-Fluorosiloxane/DMA

Films were cast from the octafluoro substituted tris methacrylate (as prepared in Example 5) using DMA as a comonomer. A 70/30 octafluoro substituted tris methacrylate/DMA formulation possessed a water content of 25%, a Dk of 42, a modulus of 107 g/mm$^2$ and a tear strength of 3.7 g/mm. In addition, films were also cast from the octafluoro substituted tris methacrylate and NVP mixtures. The resultant films were transparent without the presence of a cosolvent in the monomer mix. A 70/30/0.5 octafluoro substituted tris methacrylate/NVP/EGDMA formulation has a water content of 25 %, a Dk of 45, a modulus of 107 g/mm$^2$ and a tear strength of 3.7 g/mm.

EXAMPLE 11

Cast Molding of Octafluorosiloxane Based Lenses

Lenses were cast using the DP 100 methacrylate end-capped 25 mole % octafluoro side chain siloxane/DMA/Darocur 1173 (70/30/0.5) formulation using the cure conditions listed in Example 8. The overall yield of cosmetically acceptable lenses was 40%. Following a 2-propanol and buffered saline extraction, the resultant lenses showed excellent wettability.

All formulations further contained 20 parts hexanol. Hydroxyethyl methacrylate vinyl carbonate (HEMAVC) and ethylene diglycol methacrylate (EDGMA) are used as crosslinking agents.

Many other modifications and variations of the present invention are possible to the skilled practitioner in the field in light of the teachings herein. It is therefore understood that, within the scope of the claims, the present invention can be practiced other than as herein specifically described.

We claim:

1. In a method of making a fluorinated siloxane-containing polymer by preparing a monomer mix comprising a fluorinated siloxane-containing monomer, at least one vinyl- or acryl-containing hydrophilic monomer, and at least one initiator and curing the monomer mix, the improvement which comprises selecting the fluorinated siloxane-containing monomer from the group consisting of (a) a monomer having the general schematic representation:

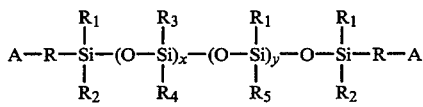

wherein:

R is an alkyl or alkylene group having 1 to 10 carbon atoms and which may have ether linkages between carbon atoms;

$R_1$–$R_4$ may independently be a monovalent hydrocarbon radical or a halogen substituted monovalent hydrocarbon radical having 1 to 18 carbon atoms which may have ether linkages between carbon atoms;

x is $\geq 0$;

y is $\geq z1$;

x+y=2 to 1000;

$R_5$ is a fluorinated side group having the general schematic representation:

wherein z is 1 to 20;

D is an alkyl or alkylene group having 1 to 10 carbon atoms and which may have ether linkages between carbon atoms; and A is an activated unsaturated group, such as an ester or amide of an acrylic or a methacrylic acid or is a group represented by the general formula:

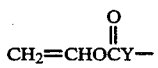

wherein

Y is —O—, —S— or —NH—; and (b) a monomer having the general schematic representation:

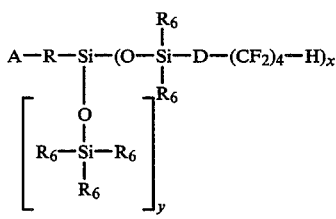

wherein

A is an activated unsaturated group, such as an ester or amide of an acrylic or a methacrylic acid;

$R_6$ is $CH_3$ or H;

R is an alkyl or alkylene group having 1 to 10 carbon atoms and which may have ether linkages between carbon atoms;

D is an alkyl or alkylene group having 1 to 10 carbon atoms and which may have ether linkages between carbon atoms;

x is 1, 2 or 3;

y is 0, 1 or 2; and x+y=3.

2. The method of claim 1 wherein said monomer mix further comprises at least one crosslinking agent.

3. The method of claim 1 wherein said siloxane-containing monomer mix comprises an additional siloxane-containing monomer.

4. The method of claim 1 wherein the siloxane-containing monomer comprises a repeating number of between from about 2 to about 200 siloxy units.

5. The method of claim 1 wherein the siloxane-containing monomer comprises about 100 repeating siloxy units.

6. The method of claim 1 wherein the fluorinated side group is comprised of an alkyloxyperfluoroalkyl group.

7. The method of claim 6 wherein the fluorinated side group is selected from the group consisting of propyloxyoctafluoropentanes, propyloxytetrafluoropropanes, and propyloxydodecafluoroheptanes.

8. The method of claim 6 wherein said fluorinated side group is represented by the formula:

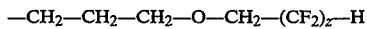

wherein z is 1 to 20.

9. The method of claim 1 wherein said monomer mix further comprises more than one hydrophilic monomer.

10. The method of claim 1 wherein said hydrophilic monomers are N,N-dimethyl acrylamide and N-vinyl pyrrolidone.

11. In a fluorinated siloxane-containing polymerization product prepared by polymerizing a monomer mix comprising a fluorinated siloxane-containing monomer, at least one vinyl- or acryl-containing hydrophilic monomer, and at least one initiator and curing the monomer mix, the improvement which comprises selecting the fluorinated siloxane-containing monomer from the group consisting of (a) a monomer having the general schematic representation:

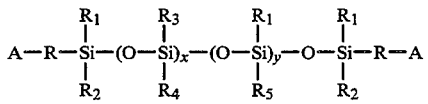

wherein:

R is an alkyl or alkylene group having 1 to 10 carbon atoms and which may have ether linkages between carbon atoms;

$R_1$–$R_4$ may independently be a monovalent hydrocarbon radical or a halogen substituted monovalent hydrocarbon radical having 1 to 18 carbon atoms which may have ether linkages between carbon atoms;

x is $\geq 0$;

y is $\geq 1$;

x+y=2 to 1000;

$R_5$ is a fluorinated side group having the general schematic representation:

wherein z is 1 to 20;

D is an alkyl or alkylene group having 1 to 10 carbon atoms and which may have ether linkages between carbon atoms; and A is an activated unsaturated group, such as an ester or amide of an acrylic or a methacrylic acid or is a group represented by the general formula:

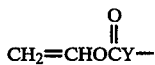

wherein
Y is —O—, —S— or —NH—; and
(b) a monomer having the general schematic representation:

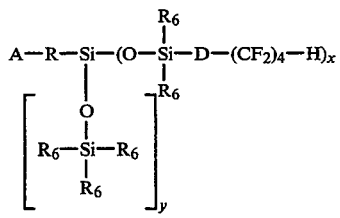

wherein
A is an activated unsaturated group, such as an ester or amide of an acrylic or a methacrylic acid;
$R_6$ is $CH_3$ or H;
R is an alkyl or alkylene group having 1 to 10 carbon atoms and which may have ether linkages between carbon atoms;
D is an alkyl or alkylene group having 1 to 10 carbon atoms and which may have ether linkages between carbon atoms;
x is 1, 2 or 3;
y is 0, 1 or 2; and
x+y=3.

12. The polymerization product of claim 11 wherein said monomer mix further comprises at least one additional siloxane-containing monomer.

13. The monomer mix of claim 11 wherein said monomer mix further comprises at least one additional crosslinking agent.

14. The polymerization product of claim 11 wherein said vinyl-containing hydrophilic monomer is selected from the group consisting of N-vinyl-N-methyl acetamide, N-vinyl-N-ethyl acetamide, N-vinyl-N-ethyl formamide, N-vinyl-formamide and N-vinyl pyrrolidone.

15. The polymerization product of claim 11 wherein said acrylic-containing hydrophilic monomer is selected from the group consisting of 2-hydroxyethyl methacrylate, glycerol methacrylate, 2-hydroxyethyl methacrylamide, methacrylic acid, acrylic acid and N,N-dimethylacrylamide.

16. The polymerization product of claim 11 wherein said polymerization product further comprises at least one additional siloxane-containing monomer.

17. The polymerization product of claim 11 wherein said monomer mix further comprises at least one additional siloxane-containing monomer.

18. The monomer mix of claim 11 wherein said monomer mix further comprises at least one additional crosslinking agent.

19. The polymerization product of claim 11 wherein said vinyl-containing hydrophilic monomer is selected from the group consisting of N-vinyl-N-methyl acetamide, N-vinyl-N-ethyl acetamide, N-vinyl-N-ethyl formamide, N-vinyl-formamide and N-vinyl pyrrolidone.

20. The polymerization product of claim 11 wherein said acrylic-containing hydrophilic monomer is selected from the group consisting of 2-hydroxyethyl methacrylate, glycerol methacrylate, 2-hydroxyethyl methacrylamide, methacrylic acid, acrylic acid and N,N-dimethylacrylamide.

21. The polymerization product of claim 11 wherein said polymerization product is a hydrogel.

22. The polymerization product of claim 11 wherein said polymerization product is a hydrogel.

* * * * *

UNITED STATES PATENT AND TRADEMARK OFFICE
CERTIFICATE OF CORRECTION

PATENT NO. : 5,387,662
DATED : February 7, 1995
INVENTOR(S) : Jay Kunzler and Richard Ozark It is certified that error appears in the above-indentified patent and that said Letters Patent is hereby corrected as shown below:

In column 1, line 55, change "4,990,382," to -- 4,990,582, -- .

In column 3, line 6, change "-D-($CF_{2,z}$ H" to -- -D-$(CF_2)_z$ H -- .

In column 12, line 27, change "g,0,013" to -- g,0.013" -- .

In column 12, line 29, change "0,005" to -- 0.005 -- .

In column 14, line 19, change "Formulation Properties" to -- Properties -- .

Signed and Sealed this

Eleventh Day of April, 1995

Attest:

BRUCE LEHMAN

*Attesting Officer*     *Commissioner of Patents and Trademarks*